US009080726B2

(12) United States Patent
Lindtner et al.

(10) Patent No.: US 9,080,726 B2
(45) Date of Patent: Jul. 14, 2015

(54) TANK SYSTEM FOR A MOTOR VEHICLE, AND OPERATING METHOD FOR THE SAME

(71) Applicant: MAGNA STEYR Fahrzeugtechnik AG & CO. KG, Graz (AT)

(72) Inventors: Werner Lindtner, Graz (AT); Peter Pucher, Judendorf-Straßengel (AT)

(73) Assignee: MAGNA STEYR Fahrzeugtechnik AG & Co KG, Graz (AT)

( * ) Notice: Subject to any disclaimer, the term of this patent is extended or adjusted under 35 U.S.C. 154(b) by 218 days.

(21) Appl. No.: 13/662,777

(22) Filed: Oct. 29, 2012

(65) Prior Publication Data

US 2013/0105235 A1 May 2, 2013

(30) Foreign Application Priority Data

Oct. 28, 2011 (DE) .................. 10 2011 117 158

(51) Int. Cl.
*F17C 1/00* (2006.01)
*B60K 5/00* (2006.01)
*B60K 15/063* (2006.01)
*B60K 15/03* (2006.01)

(52) U.S. Cl.
CPC . *F17C 1/005* (2013.01); *B60K 5/00* (2013.01); *B60K 15/03006* (2013.01); *B60K 15/063* (2013.01); *B60K 2015/03019* (2013.01); *Y02T 10/16* (2013.01)

(58) Field of Classification Search
None
See application file for complete search history.

(56) References Cited

U.S. PATENT DOCUMENTS

| 5,415,001 A * | 5/1995 | Powars ................. 62/50.2 |
| 2003/0077181 A1* | 4/2003 | Rajewski ................ 417/234 |
| 2006/0250902 A1 | 11/2006 | Bender et al. |
| 2008/0187789 A1* | 8/2008 | Ghezel-Ayagh ............ 429/13 |
| 2010/0078244 A1* | 4/2010 | Pursifull ................ 180/69.5 |
| 2010/0320224 A1* | 12/2010 | Lampe et al. ............... 222/1 |

FOREIGN PATENT DOCUMENTS

| CN | 2439983 Y | 7/2001 |
| CN | 2858974 Y | 1/2007 |
| CN | 101105159 A | 1/2008 |
| CN | 201186605 Y | 1/2009 |
| JP | 2002-257618 A | 9/2002 |
| JP | 2008-19719 A | 1/2008 |
| WO | 2010/124658 A1 | 11/2010 |

* cited by examiner

Primary Examiner — J. Allen Shriver, II
Assistant Examiner — Hilary L Johns
(74) Attorney, Agent, or Firm — Jordan IP Law, LLC; Todd A. Vaughn

(57) ABSTRACT

A tank system for a motor vehicle, tank system including at least one first compressed gas vessel defining a first vessel space configured to receive natural gas, and at least one second compressed gas vessel defining a second vessel space configured to receive at least one of natural gas and liquefied gas.

20 Claims, 2 Drawing Sheets

TANK SYSTEM FOR A MOTOR VEHICLE, AND OPERATING METHOD FOR THE SAME

CROSS-REFERENCE TO RELATED APPLICATIONS

The present application claims priority under 35 U.S.C. §119 to German Patent Application No. DE DE 10 2011 117 158.8 (filed on Oct. 28, 2011), which is hereby incorporated by reference in its entirety.

FIELD OF THE INVENTION

Embodiments of the invention relate to a tank system for a motor vehicle and a method of operating a tank system, the tank system including at least one first compressed gas vessel defining a vessel space configured to receive and store a fluid such as natural gas.

BACKGROUND OF THE INVENTION

Vehicles which operate using natural gas are known. Despite the advantages of natural gas over fuels such as gasoline and diesel both with regard to price and environmental compatibility, vehicles operated using natural gas make up only a negligible fraction of the overall number of all registered vehicles. This is due, inter alia, to the fact that there are considerably fewer fuelling stations for natural gas than there are fuelling stations for gasoline and diesel, and the willingness of vehicle owners to convert to natural gas is therefore only very low.

Japanese Patent Publication JP 2002 257618 A discloses a tank that can be filled with a natural gas such as compressed natural gas (CNG) or a liquefied gas such as liquefied petroleum gas (LPG). Although the flexibility of a vehicle can be increased in this way, this is based on certain conditions. For example, natural gas is stored at a pressure of approximately 200 bar, whereas liquefied gas is stored at a pressure of approximately 10 to 15 bar. This means that a tank filled with natural gas cannot readily be refilled with liquefied gas. This is possible only when the pressure in the tank has fallen below 10 to 15 bar. As is clearly evident, the flexibility seemingly obtained is thus considerably restricted in practice.

Furthermore, it is known to operate vehicles with natural gas and also gasoline. For this purpose, the stated vehicles have a separate tank of approximately 10 to 15 liters storage capacity. Although it is possible in this way to profit from the very dense fuelling station network for gasoline, it is necessary for this purpose to provide a complete gasoline tank system with separate lines, pumps, etc., which firstly restricts the space availability in the vehicle in question and secondly leads to increased purchase costs of such a vehicle. For this reason, few such vehicles are purchased by potential users.

SUMMARY OF THE INVENTION

Embodiments of the invention provide an enhanced tank system and an enhanced method of operating a tank system. Such embodiments increase the flexibility of a gas-operated vehicle in everyday use in a manner that will considerably increase user acceptance, without the need for a separate gasoline tank.

Embodiments of the invention provide a tank system including at least one first compressed gas vessel defining a vessel space configured to receive and store a fluid such as natural gas and at least one second compressed gas vessel configured to receive and store a fluid such as natural gas and/or liquefied gas.

Embodiments of the invention provide a method of operating a tank system including at least one first compressed gas vessel defining a vessel space configured to receive and store a fluid such as natural gas and at least one second compressed gas vessel configured to receive and store a fluid such as natural gas and/or liquefied gas.

Such a system and method are advantageous in making it possible for a vehicle to be fuelled with liquefied gas even in instances where considerable quantities of natural gas are still stored in the vehicle, specifically in the first compressed gas vessel.

Such a system and method are also advantageous in making to possible to increase storage capacity for natural gas by utilizing the compressed gas vessels to receive and store natural gas. The flexibility of the vehicle, and thus, user acceptance are thereby considerably increased by the stated measures, without the need for a separate tank system for gasoline.

In accordance with embodiments, a motor vehicle includes at least one of the following: at least one first compressed gas vessel defining a first vessel space configured to receive natural gas, and at least one second compressed gas vessel defining a second vessel space configured to receive at least one of natural gas and liquefied gas.

In accordance with embodiments, a tank system for a motor vehicle includes at least one of the following: at least one of an internal combustion engine and a fuel cell; and a tank system configured to supply at least one of natural gas and liquefied gas to the at least one of the internal combustion engine and the fuel cell, the tank system including at least one first compressed gas vessel defining a first vessel space configured to receive natural gas, and at least one second compressed gas vessel defining a second vessel space configured to receive at least one of natural gas and liquefied gas.

In accordance with embodiments, a method of operating a tank system for a motor vehicle includes at least one of the following: filling at least one first compressed gas vessel of the tank system with natural gas, and filling at least one second compressed gas vessel of the tank system with at least one of natural gas and liquefied gas.

Further advantageous embodiments and refinements of the invention will emerge from the subclaims and from the description in conjunction with the figures.

In accordance with embodiments, the at least one second compressed gas vessel(s) can be configured to have a volumetric capacity that is less than the at least one first compressed gas vessel(s). This is advantageous in permitting quick and efficient emptying of the second compressed gas vessel(s) relative to the first compressed gas vessel(s), and thus, may be refuelled with a fluid such as liquefied gas at a faster rate.

Alternatively, the first and the second compressed gas vessel(s) may be configured to have the same volumetric capacity.

Alternatively, the second compressed gas vessels may be configured to have a greater volumetric capacity than the first compressed gas vessel(s). This is advantageous in increasing the overall range of the vehicle in liquefied gas operation.

As a result of different specific weights, natural gas accumulates in the upper region of the compressed gas vessel and liquefied gas accumulates in the lower region. Accordingly, it is further advantageous for the second compressed gas vessel(s) to include a first extraction pipe its upper region and a second extraction pipe in its lower region, each of the extraction pipes operatively connected to and/or in fluidic communication with the second compressed gas vessel(s). This is advantageous in permitting, in circumstances in which a mixture of natural gas and liquefied gas is stored in the second compressed gas vessel(s), for efficient extraction of the natural gas and/or liquefied gas to be extracted from the second compressed gas vessel(s) in a targeted manner through the two extraction tubes.

It is also additionally advantageous for the at least one second compressed gas(s) vessel to include an extraction pipe(s) that is operatively connected to and/or in fluidic communication with and also spatially adjustable (manually and/or automatically in a controlled manner) relative to the respective second compressed gas vessel. This is a further possibility for the targeted extraction of natural gas or liquefied gas from the second compressed gas vessel. If the extraction pipe is in the upper region of the second compressed gas vessel, then natural gas is extracted, and if the extraction pipe is in the lower region, then liquefied gas is extracted.

It is expedient for the at least one first compressed gas vessel and the at least one second compressed gas vessel to include separate extraction pipes operatively connected to and/or in fluidic communication with respectively therewith. This is advantageous to permit a particular compressed gas vessel to be emptied in a targeted manner.

It is furthermore advantageous for the at least one first compressed gas vessel to be assigned a filler neck for natural gas and for the at least one second compressed gas vessel to be assigned a first filler neck for natural gas and a second filler neck for liquefied gas.

Alternatively, a single filler neck for natural gas may be provided for both compressed gas vessels. It is advantageous, therefore, to utilize different connection systems for natural gas and liquefied gas.

It is furthermore advantageous for the tank system to include a liquid separator which is arranged in the course of an extraction line connected to the at least one second compressed gas vessel. In this way, natural gas and liquefied gas may be prevented from being conducted out of the tank system in mixed form, because the liquefied gas is separated out at the liquid separator.

It is yet also advantageous for the at least one second compressed gas vessel to include a heating device. In this way, the liquefied gas can be evaporated and extracted in the gaseous state from the second compressed gas vessel. The heating device may, for example, be electrically operated and/or controlled.

It is yet and still also advantageous the at least one second compressed gas vessel to include a heating device configured for operational connection to an internal combustion engine and/or a fuel cell. The heating device may, for example, be designed for operational connection to a cooling system of the internal combustion engine and/or the fuel cell. Furthermore, the heating device may be designed for operational connection to an exhaust system of the internal combustion engine and/or the fuel cell. In this way, no additional energy need be expended for the heating device, because use is simply made of the waste heat of the internal combustion engine and/or of the fuel cell.

It is even furthermore advantageous to have depletion or emptying of the compressed gas vessels in a preferentially manner, particularly, for the at least one second compressed gas vessel to be emptied preferentially relative to the at least one first compressed gas vessel. In this way, not only refuelling with natural gas but also refuelling with liquefied gas can be performed as quickly as possible.

It is also advantageous for the at least one second compressed gas vessel to be emptied preferentially relative to the at least one first compressed gas vessel such that a residual pressure of the at least one second compressed gas vessel is reduced to below 15 bar, in particular to below 5 bar. In this way, the second compressed gas vessel need not be completely emptied in order to permit refuelling with liquefied gas.

It is even still further advantageous for the pressure reduction in the at least one second compressed gas vessel to be performed via the pressure energy of the natural gas stored in the at least one first compressed gas vessel. In this way, no additional energy need be expended for the emptying of the second compressed gas vessel.

It is also advantageous for the pressure reduction in the at least one second compressed gas vessel to be performed via a suction jet pump driven by the natural gas. For this purpose, the at least one first compressed gas vessel is connected to a propellent nozzle, and the at least one second compressed gas vessel is connected to a suction opening of a suction jet pump. A suction jet pump includes a propellent nozzle arranged in a line, and a mixing pipe which is arranged downstream of the propellent nozzle and which forms and/or is in fluidic communication to a suction opening positioned upstream of the outlet opening of the propellent nozzle in the course of the flow. As a result of the generated negative pressure of the liquid emerging from the propellent nozzle, liquid and gas are sucked through the suction opening into the mixing pipe. An example of a suction jet pump of said type is disclosed, for example, in DE 198 35 157.

The above embodiments and refinements of the invention may be combined in any desired way.

BRIEF DESCRIPTION OF THE DRAWINGS

Embodiments of the invention will be explained in more detail below in the schematic figures of the drawing, in which.

DETAILED DESCRIPTION OF EMBODIMENTS

Figure 1:
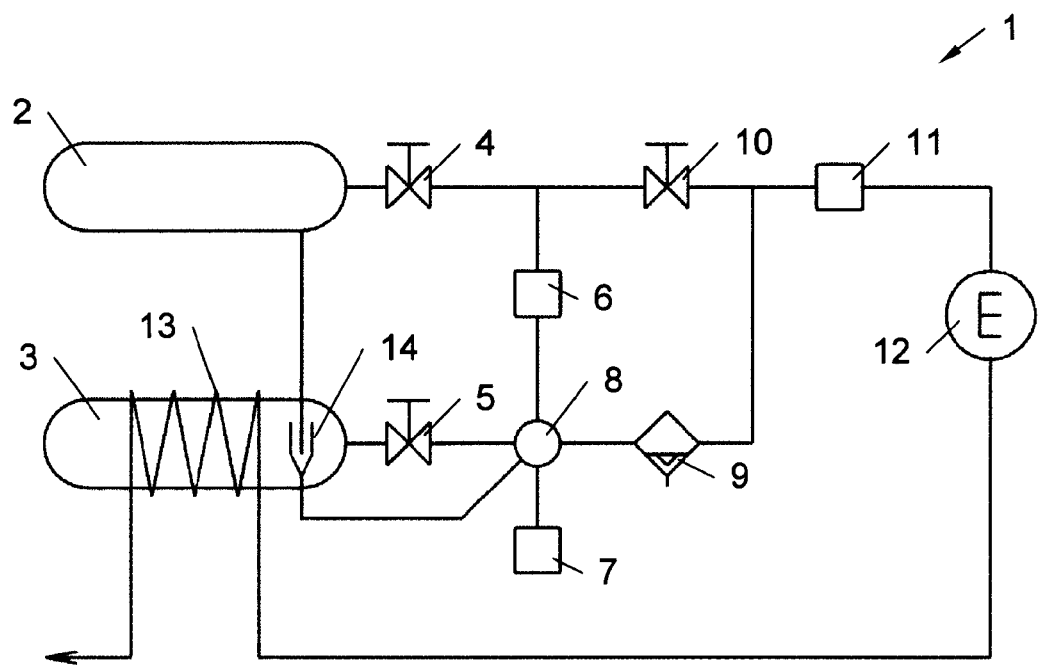
FIG. 1 illustrates a block circuit diagram of a tank system in accordance with embodiments of the invention.

FIG. 1 illustrates a tank system 1 for a motor vehicle, having a first compressed gas vessel 2 and a second compressed gas vessel 3. The first compressed gas vessel 2 is operatively connected to and/or in fluidic communication with a shut-off valve 4. The second compressed gas vessel 3 is operatively connected to and/or in fluidic communication with a shut-off valve 5. The first compressed gas vessel 2 is assigned and in fluidic communication with a first filler neck 6 for natural gas. The second compressed gas vessel 3 is operatively connected to and/or in fluidic communication with the first filler neck 6 for natural gas and a second filler neck 7 for liquefied gas. Advantageously, the tank system 1 includes a single filler neck 6 for natural gas, which single filler neck 6 can be used for both the first compressed gas vessel 2 and the second compressed gas vessel 3.

The tank system 1 also includes a multi-way valve 8 and a liquid separator 9 which is arranged in the course of an extraction fluid line operatively connected to and/or in fluidic communication with the second compressed gas vessel 3. Another shut-off valve 10, a pressure regulating valve 11, a heating device 13 assigned to the second compressed gas vessel 3, and a suction jet pump 14. The first compressed gas vessel 2 is operatively connected to and/or in fluidic communication with a propellent nozzle of the suction jet pump 14, and the at least one second compressed gas vessel 3 is connected to and/or in fluidic communication with a suction opening of the suction jet pump 14. As illustrated in FIG. 1, the tank system 1 is operatively connected to and/or in fluidic communication with an internal combustion engine 12.

The function of the tank system 1 is as follows. In normal operation, the first compressed gas vessel 2 is filled with natural gas at a pressure of approximately 200 bar via the first filler neck 6. For this purpose, the shut-off valve 4 is in open position, the shut-off valve 10 is in a closed position, and the multi-way valve 8 is moved into a position in which it shuts off fluid flow from the first filler neck 6.

The second compressed gas vessel 3 can likewise be filled with natural gas, again via the first filler neck 6. For this purpose, the shut-off valve 4 and the shut-off valve 10 are respectively in a closed position, the shut-off valve 5 is in an open position, and the multi-way valve 8 is moved into a position in which the filler neck 6 is connected to and/or in fluidic communication with the second compressed gas vessel 3.

Alternatively or in addition, the second compressed gas vessel 3 can be filled with liquefied gas at a pressure in a range of between 10 to 15 bar via the second filler neck 7, in which the multi-way valve 8 is moved into a position in which the second compressed gas vessel 3 is connected to and/or in fluidic communication with the filler neck 7.

By way of example, a situation is hereby described in which both the first compressed gas vessel 2 and the second compressed gas vessel 3 is filled with natural gas. The internal combustion engine 12 can be operated in a manner known per se by virtue of the shut-off valve 4 and the shut-off valve 10 being respectively in an open position. The pressure is regulated to a value suitable for the internal combustion engine 12 via the pressure regulating valve 11. The internal combustion engine 12 can be operated in this way until the first compressed gas vessel 2 is empty or the residual pressure has reduced to a predetermined level of, for example, approximately 18 bar.

Thereafter, by virtue of the shut-off valve 4 and/or the shut-off valve 10 being respectively in a closed position, the shut-off valve 5 being in an open position and the multi-way valve 8 being switched to permit flow to/through the liquid separator 9, the internal combustion engine 12 can be operated from the second compressed gas vessel 3 until the second compressed gas vessel 3 is likewise empty or the residual pressure has fallen to a predetermined level of, for example, approximately 18 bar.

The internal combustion engine may also be supplied from both the first compressed gas vessel 2 and the second compressed gas vessel 3 simultaneously.

The vehicle can now be fuelled with natural gas again. In the described state, however, fuelling with liquefied gas is not possible because the pressure in the second compressed gas vessel 3 is approximately 18 bar, which is thus higher than the pressure at which a liquefied gas fuelling process can occur (approximately 10 to 15 bar). Therefore, an alternative scenario will now be described, in which both the first compressed gas vessel 2 and the second compressed gas vessel 3 is filled with natural gas. In this circumstance, however, the second compressed gas vessel 3 is emptied on a preferential basis. When the residual pressure in the second compressed gas vessel 3 is at a predetermined level of, for example, approximately 18 bar, the multi-way valve 8 is switched such that the suction jet pump 14 is connected to and/or in fluidic communication with the liquid separator 9.

In such a circumstance, the first compressed gas vessel 2 is emptied, but likewise continues to extract natural gas from the second compressed gas vessel 3 via the suction jet pump 14. In this way, the pressure in the second compressed gas vessel 3 is reduced to a predetermined level of, for example, one of less than 15 bar, preferably to less than 10 bar, and even more preferably to less than 5 bar. The pressure reduction in the at least one second compressed gas vessel 3 is thus realized here via the pressure energy of the natural gas stored in the first compressed gas vessel 2. When the pressure in the second compressed gas vessel 3 has fallen, the first compressed gas vessel 2 can be emptied further, as already described above, directly via the shut-off valve 4 being in a open position.

The pressure in the second compressed gas vessel 3 now advantageously lies below the pressure level during the liquefied gas filling process. That is to say, the second compressed gas vessel 3 can now also be filled with liquefied gas. The flexibility of the tank system 1 is significantly increased in this way.

Figure 2:
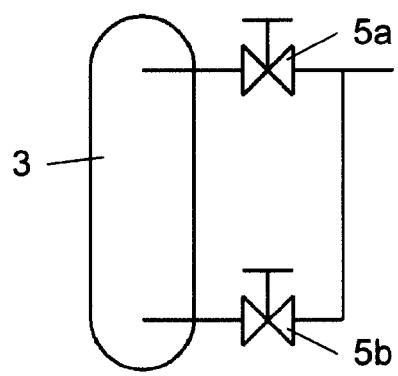
FIG. 2 illustrates a compressed gas vessel having two extraction pipes in accordance with embodiments of the invention.

If liquefied gas is refuelled, then a mixture of natural gas and liquefied gas is stored in the second compressed gas vessel 3. In order to enable the extraction of natural gas or liquefied gas in a targeted manner from the second compressed gas vessel 3, the second compressed gas vessel 3 may, as illustrated in FIG. 2, be connected to and/or in fluidic communication with a first extraction pipe at its upper region via a first upper valve 5a and a second extraction pipe at its lower region via a second lower valve 5b. As a result of the different specific weights, it is now possible for natural gas to be extracted via the valve 5a and for liquefied gas to be extracted via the valve 5b.

Figure 3:
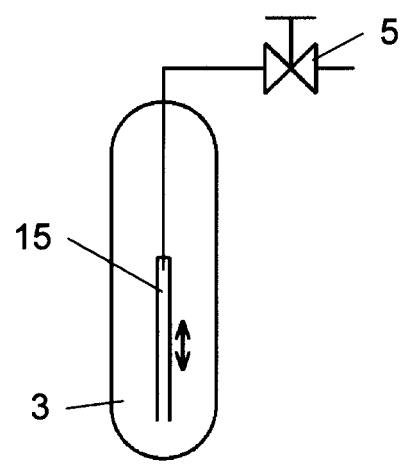
FIG. 3 illustrates a compressed gas vessel with a height-adjustable extraction pipe in accordance with embodiments of the invention.

As illustrated in FIG. 3, alternatively, the second compressed gas vessel 3 may also include a height-adjustable extraction pipe 15 configured to enable the extraction of natural gas or liquefied gas in a targeted manner from the second compressed gas vessel 3. If the extraction pipe 15 is in the upper region of the second compressed gas vessel 3, then natural gas is extracted, and if the extraction pipe is in the lower region, then liquefied gas is extracted.

In the above example, it has been assumed that the tank system 1 is provided for a supply to an internal combustion engine 12. This is, however, in no way limited to only such circumstances. For example, it is also possible for a fuel cell to be provided instead of and/or in addition to the internal combustion engine 12. Here, the tank system is suitable in particular for a motor vehicle. A particular advantage of this is that it is possible to utilize both fuelling stations which sell natural gas and also fuelling stations which sell liquefied gas. The flexibility of the vehicle, and therefore also user acceptance, are thus increased enormously.

The second compressed gas vessel 3 is heated in order to enhance the extraction of the liquefied gas therefrom. As a result of heating the second compressed gas vessel, the vapour pressure rises, and the liquefied gas can be extracted in gaseous form, in particular, via the line which is also provided for the extraction of natural gas. Separate extraction pipes, as illustrated in FIG. 2, or a height-adjustable extraction pipe 15 as illustrated in FIG. 3, are then not imperatively necessary.

The heating of the second compressed gas vessel 3 may be realized via a heating device 13 which is operatively connected to the internal combustion engine 12 and/or a fuel cell. It is for example possible for the waste heat of a cooling system of the internal combustion engine 12 and/or the fuel cell to be utilized for the heating of the second compressed gas vessel 3. Alternatively and/or in addition, it is also possible for the energy contained in the exhaust gas of the internal combustion engine 12 and/or the fuel cell to be utilized for heating the second compressed gas vessel 3. Accordingly, the heating device 13 may be operatively connected to a cooling system and/or an exhaust system of the internal combustion engine 12 and/or the fuel cell.

Finally, it is pointed out that the components in the figures may not be illustrated to scale, and that the individual variants illustrated in the figures may also form the subject matter of an independent invention. Spatial definitions such as "right," "left," "upper," "lower" and the like relate to the illustrated position of the respective component, and should be appropriately mentally adapted in the event of a change to the specified position.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A tank system for a motor vehicle, comprising:
   at least one first compressed gas vessel defining a first vessel space to receive natural gas;
   at least one second compressed gas vessel defining a second vessel space to receive natural gas and liquefied gas;
   a first extraction pipe in fluidic communication with the at least one second compressed gas vessel at an upper region of the at least one second compressed gas vessel; and
   a second extraction pipe in fluidic communication with the at least one second compressed gas vessel at a lower region of the at least one second compressed gas vessel.

2. The tank system of claim 1, wherein the at least one second compressed gas vessel has a volumetric capacity that is less than the volumetric capacity of the at least one first compressed gas vessel.

3. The tank system of claim 1, further comprising:
   a first filler neck for natural gas and in fluidic communication with the at least one first compressed gas vessel; and
   a second filler neck for natural gas and liquefied gas and in fluidic communication with the at least one second compressed gas vessel.

4. The tank system of claim 1, further comprising a liquid separator in fluidic communication the at least one second compressed gas vessel.

5. The tank system of claim 1, further comprising a heating device to heat the at least one second compressed gas vessel.

6. The tank system of claim 5, wherein the heating device is for operative connection to at least one of an internal combustion engine of the motor vehicle and a fuel cell of the motor vehicle.

7. The tank system of claim 6, wherein the heating device is for operative connection to a cooling system of at least one of the internal combustion engine of the motor vehicle and the fuel cell of the motor vehicle.

8. The tank system of claim 6, wherein the heating device is for operative connection to an exhaust system of at least one of the internal combustion engine of the motor vehicle and of the fuel cell of the motor vehicle.

9. The tank system of claim 1, further comprising:
   a propellent nozzle in fluidic communication with the at least one first compressed gas vessel; and
   a suction jet pump in fluidic communication with the at least one second compressed gas vessel.

10. A motor vehicle comprising:
    at least one of an internal combustion engine and a fuel cell;
    a tank system to supply at least one of natural gas and liquefied gas to the at least one of the internal combustion engine and the fuel cell, the tank system including:
      at least one first compressed gas vessel defining a first vessel space to receive natural gas;
      at least one second compressed gas vessel defining a second vessel space to receive natural gas and liquefied gas;
      a first extraction pipe in fluidic communication with the at least one second compressed gas vessel at an upper region of the at least one second compressed gas vessel; and
      a second extraction pipe in fluidic communication with the at least one second compressed gas vessel at a lower region of the at least one second compressed gas vessel.

11. The motor vehicle of claim 10, further comprising a heating device to heat the at least one second compressed gas vessel, the heat device being operatively connected to the at least one of the internal combustion engine and the fuel cell.

12. The motor vehicle of claim 11, wherein the heating device is for operative connection to an exhaust system of at least one of the internal combustion engine and the fuel cell.

13. The motor vehicle of claim 10, further comprising:
    a first filler neck for natural gas and in fluidic communication with the at least one first compressed gas vessel; and
    a second filler neck for natural gas and liquefied gas and in fluidic communication with the at least one second compressed gas vessel.

14. The motor vehicle of claim 10, further comprising a liquid separator in fluidic communication the at least one second compressed gas vessel.

15. The motor vehicle of claim 10, further comprising:
    a propellent nozzle in fluidic communication with the at least one first compressed gas vessel; and
    a suction jet pump in fluidic communication with the at least one second compressed gas vessel.

16. A tank system for a motor vehicle, comprising:
    a first compressed gas vessel defining a first vessel space to receive natural gas;
    a second compressed gas vessel defining a second vessel space to receive natural gas and liquefied gas; and
    an extraction pipe in the second vessel space and in fluidic communication with the second compressed gas vessel, wherein the extraction pipe is for vertical spatial adjustment relative to the second compressed gas vessel.

17. The tank system of claim 16, further comprising a heating device to heat the second compressed gas vessel, the heat device being operatively connected to the at least one of an internal combustion engine of the motor vehicle and a fuel cell of the motor vehicle.

18. The tank system of claim 17, wherein the heating device is for operative connection to an exhaust system of at least one of the internal combustion engine and the fuel cell.

19. The tank system of claim 16, further comprising:
    a first filler neck for natural gas and in fluidic communication with the at least one first compressed gas vessel; and
    a second filler neck for natural gas and liquefied gas and in fluidic communication with the second compressed gas vessel.

20. The tank system of claim 16, further comprising:
a liquid separator in fluidic communication the second compressed gas vessel;
a propellent nozzle in fluidic communication with the first compressed gas vessel; and
a suction jet pump in fluidic communication with the second compressed gas vessel.

* * * * *